(12) United States Patent
Doi et al.

(10) Patent No.: US 8,763,452 B2
(45) Date of Patent: Jul. 1, 2014

(54) THERMAL AIR FLOW SENSOR

(75) Inventors: Ryosuke Doi, Hitachinaka (JP); Keiji Hanzawa, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 279 days.

(21) Appl. No.: 13/209,883

(22) Filed: Aug. 15, 2011

(65) Prior Publication Data

US 2012/0055245 A1    Mar. 8, 2012

(30) Foreign Application Priority Data

Sep. 3, 2010    (JP) .................................. 2010-197253

(51) Int. Cl.
*G01F 1/68*    (2006.01)

(52) U.S. Cl.
USPC ...................................................... 73/204.11

(58) Field of Classification Search
USPC ............... 73/204.11, 204.26, 204.21, 204.25, 73/204.22
See application file for complete search history.

(56) References Cited

U.S. PATENT DOCUMENTS

| | | | | |
|---|---|---|---|---|
| 5,313,832 A * | 5/1994 | Stephan et al. | ............ | 73/204.26 |
| 5,404,753 A | 4/1995 | Hecht et al. | | |
| 5,717,136 A * | 2/1998 | Aoi et al. | .................... | 73/204.26 |
| 6,150,681 A * | 11/2000 | Allen | ............................ | 257/254 |
| 6,318,170 B1 | 11/2001 | Renninger et al. | | |
| 6,393,907 B1 * | 5/2002 | Yamakawa et al. | ......... | 73/204.26 |
| 6,675,644 B2 * | 1/2004 | Yamakawa et al. | ......... | 73/204.26 |
| 6,805,003 B2 * | 10/2004 | Ueki et al. | .................. | 73/204.26 |
| 6,871,537 B1 * | 3/2005 | Gehman et al. | ............. | 73/204.26 |
| 7,211,873 B2 * | 5/2007 | Toyoda | .......................... | 257/417 |
| 7,437,927 B2 * | 10/2008 | Yamada et al. | ............. | 73/204.21 |
| 7,530,267 B2 * | 5/2009 | Uramachi | ..................... | 73/202.5 |
| 8,181,514 B2 * | 5/2012 | Ariyoshi et al. | ............. | 73/202.5 |

FOREIGN PATENT DOCUMENTS

| | | |
|---|---|---|
| DE | 42 19 454 A1 | 12/1993 |
| DE | 197 43 409 A1 | 4/1999 |
| DE | 10 2007 034 919 A1 | 3/2009 |
| JP | 2002-357467 A | 12/2002 |
| JP | 2003-270016 A | 9/2003 |
| JP | 2005-98795 A | 4/2005 |

OTHER PUBLICATIONS

European Search Report dated Feb. 10, 2012 (Five (5) pages).
European Search Report dated Jun. 14, 2012 (Ten (10) pages).

* cited by examiner

*Primary Examiner* — Jewel V Thompson
(74) *Attorney, Agent, or Firm* — Crowell & Moring LLP

(57) ABSTRACT

In a thermal air flow sensor according to the invention, a hollow formed in a detecting element is communicated with a circuit chamber, in which driving circuit parts of the detecting element are mounted, or an intake duct exterior. Thereby, pressure in the hollow balances with pressure on the outside. Also, since the circuit chamber is provided to be isolated from a detection chamber, in which a detecting part of the detecting element is arranged, that is, a passage chamber, through which air being a measuring object flows, air flowing in the passage chamber can be restrained from flowing into the hollow to have an influence on flow output characteristics.

17 Claims, 9 Drawing Sheets

THERMAL AIR FLOW SENSOR

BACKGROUND OF THE INVENTION

The present invention relates to a sensor for measuring flow rate of fluid, and more particular, to a thermal air flow sensor.

As an air flow sensor provided in an intake manifold of an internal combustion engine in automobiles, etc. to measure an intake air quantity, a thermal air flow sensor has become the mainstream because of its ability of direct detection of a mass air quantity.

Recently, attention has been paid to air flow sensors manufactured by means of the semiconductor micromachining technology because of high speed responsibility and capability of detection of reverse flow making use of a high speed in responsibility.

However, it is known that thermal air flow sensors with the use of a semiconductor substrate are varied in flow output characteristics due to invasion of dirt substances, such as oil, dust, etc., and moisture onto a rear surface of a detecting element. JP-A-2003-270016 discloses a thermal air flow sensor, in which a hollow is provided in a plate-shaped substrate to form a diaphragm and a porous water proofing body is provided at an opening of the hollow.

With the conventional, thermal air flow sensor, when a detecting element comprising the plate-shaped substrate formed with the hollow and the diaphragm is bonded to a support, a clearance between the rear surface of the detecting element and a detecting element mounting surface of the support is liable to vary widely in dimension and it is difficult to control the clearance in dimension. When the clearance varies widely in dimension, air flowing into the hollow varies in quantity and direction, so that a curve is produced in a flow characteristic curve to cause a decrease in product yield.

In order to avoid the problem, it suffices to fully shield the hollow (diaphragm rear surface) from a passage chamber (a detection chamber in which a detecting part of the detecting element is arranged), through which air being a measuring object flows. That is, it suffices to put the hollow in a sealed state. Specifically, it suffices to bond whole periphery of the hollow by means of an adhesive in a manner to surround the hollow, thereby sealing the inside of the hollow. Since in general, detecting elements are rectangular-shaped, it suffices to bond all sides of a rectangular configuration.

When the whole periphery of the hollow is bonded by means of an adhesive to seal the inside of the hollow, however, there is caused a problem that complete sealing cannot be performed because variation in temperature and pressure causes air in the hollow (diaphragm rear surface) to expand in volume to result in breakage of the detecting element.

It is an object of the invention to provide a thermal air flow sensor, which is hard to be influenced by air flow being a measuring object and able to prevent breakage of a diaphragm due to variation in temperature and pressure.

BRIEF SUMMARY OF THE INVENTION

In order to attain the object, in a thermal air flow sensor according to the invention, a hollow formed in a detecting element is communicated with a circuit chamber in which driving circuit parts of the detecting element are mounted, or an exterior of an intake duct. Thereby, pressure in the hollow balances with pressure on the outside. Also, since the circuit chamber is provided to be isolated from a detection chamber (a passage chamber, through which air being a measuring object flows), in which a detecting part of the detecting element is arranged, air flowing in the passage chamber can be restrained from flowing into the hollow to have influence on flow output characteristics.

According to the invention, there is provided a thermal air flow sensor capable of avoiding breakage of a detecting element due to variation in temperature and pressure and realizing high-precision measurement of air flow.

DETAILED DESCRIPTION OF THE INVENTION

A thermal air flow sensor according to the invention will be described hereinafter. In addition, air is adopted as fluid being a measuring object in the following descriptions but other fluids can also be made a measuring object.

Embodiment 1

FIGS. 1 to 5 schematically show a thermal air flow sensor according to the invention.

Figure 2:
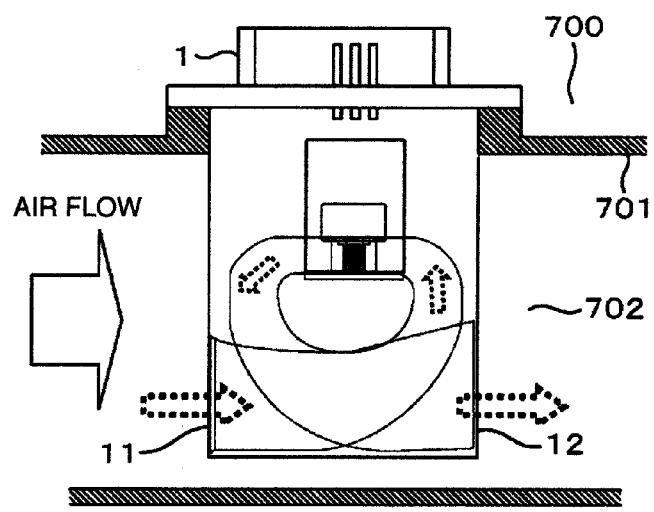
FIG. 2 is a view illustrating a manner, in which a thermal air flow sensor is mounted.

First, an environment, in which the thermal air flow sensor is mount will be described with reference to FIG. 2.

The thermal air flow sensor 1 is mounted to an intake duct 701 and air flowing in an intake duct interior 702 enters a passage from an upstream side opening 11 of the thermal air flow sensor 1, goes through the passage, and goes out of a downstream side opening 12.

Also, since an intake duct exterior 700 is completely isolated from the intake duct interior 702, the intake duct exterior 700 is put in a windless state even when air flows in the intake duct interior 702.

Figure 3A:
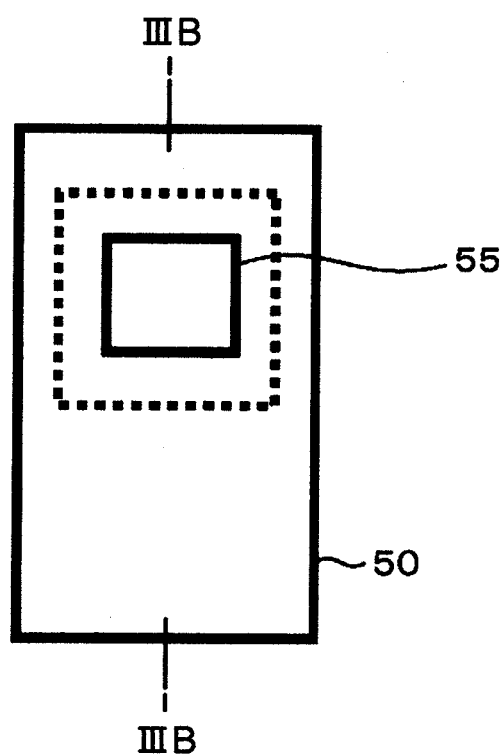
FIGS. 3A and 3B are views schematically illustrating a detecting element of a thermal air flow sensor, FIG. 3A being a plan view, and FIG. 3B being a cross sectional view taken along line IIIB-IIIB in FIG. 3A.
Figure 3B:
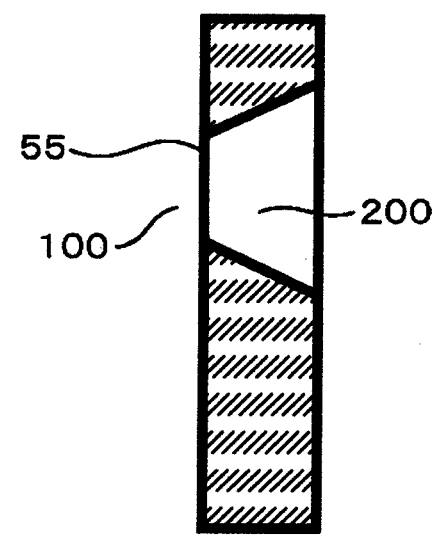

Subsequently, shape of a detecting element will be described with reference to FIG. 3.

In general, the detecting element 50 is rectangular-shape. A detecting part of the detecting element 50 comprises a thin film region called a diaphragm 55, and the diaphragm 55 is arranged in a passage chamber 300 (see FIG. 1), through which air being a measuring object flows. In this case, the passage chamber 300, in which the diaphragm 55 is arranged, constitutes a detection chamber.

In general, the diaphragm 55 is formed by means of etching in a direction from a rear surface of the detecting element 50 to provide a hollow 200 on the rear surface. The purpose of making the diaphragm 55 a thin film is based on an advantage that reduction in thermal capacity mainly makes it possible to achieve an increase in thermal responsibility and to accomplish reduction in power consumption.

First Embodiment

Figure 1:
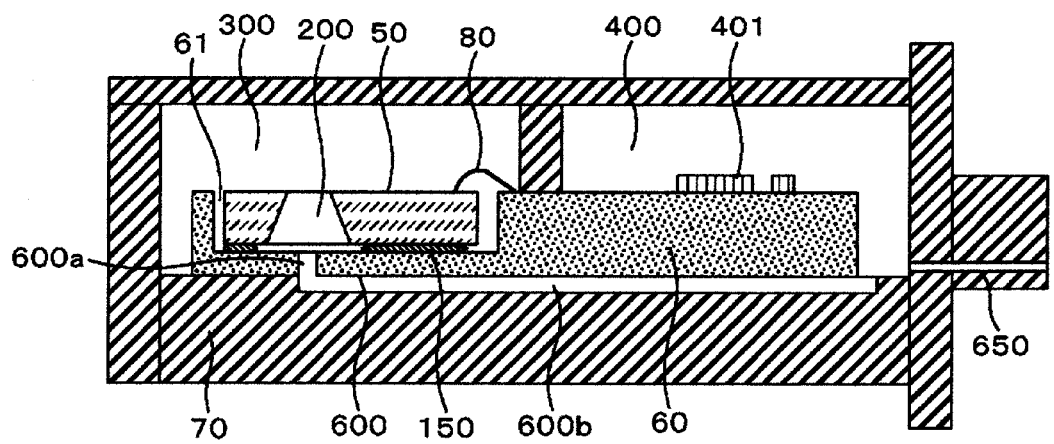
FIG. 1 is a cross sectional view of a first embodiment of a thermal air flow sensor according to the invention.

Subsequently, a first embodiment of a thermal air flow sensor according to the invention will be described with reference to FIG. 1.

In the present embodiment, the detecting element 50 is mounted on a LTCC (Low Temperature Co-Fired Ceramic) laminated substrate 60 (referred hereinafter to as ceramic substrate). A dent called a cavity 61 is provided in the ceramic substrate 60 so as to enable receiving the detecting element 50.

The detecting element 50 and the ceramic substrate 60 are connected electrically to each other by an Au wire 80.

Figure 4A:
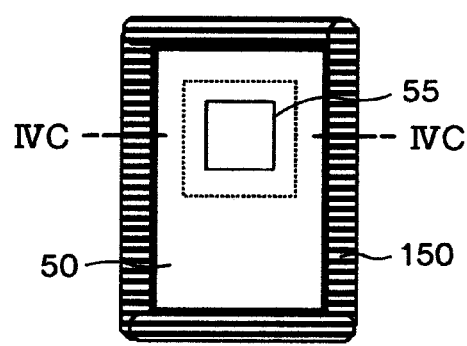
FIGS. 4A to 4D are views illustrating application configurations of an adhesive on a detecting element, FIG. 4A being a view showing an upper surface of the detecting element, FIG. 4B being a view showing a rear surface of the detecting element, FIG. 4C being a cross sectional view taken along line IVC-IVC in FIG. 4A, and FIG. 4D being a cross sectional view taken along line IVD-IVD in FIG. 4B.
Figure 4B:
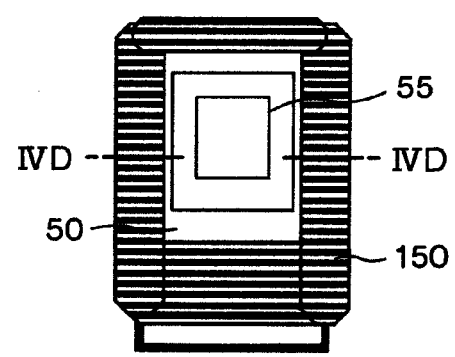
Figure 4C:
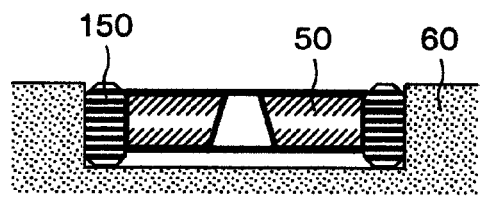

All four sides of the detecting element 50 are bonded in the cavity 61 by means of an adhesive 150 as shown in FIGS. 4A and 4C. At this time, the use of the adhesive forms a clearance in the order of 1 μm~100 μm between the rear surface of the detecting element 50 and a bottom surface of the cavity 61.

Figure 4D:
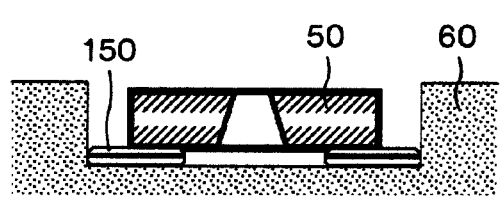

In this case, in order to isolate the hollow 200 of the detecting element 50 from the passage chamber 300, an application pattern of the adhesive 150 can adopt a manner of application in gaps between sides of the cavity 61 and sides of the detecting element 50 as shown in FIGS. 4A and 4C, or a manner of application on the rear surface of the detecting element 50 as shown in FIGS. 4B and 4D.

The ceramic substrate 60 is bonded to a resin member 70. The passage chamber 300 and a circuit chamber 400, in which driving circuit parts (electronic parts such as resistor, capacitor, LSI chip, etc.) 401 are mounted, is completely isolated by a resin part. In the case where a gap is generated between the resin part and the ceramic substrate, a high fluidity material such as adhesive or the like is filled in the gap to enable sure isolation between the passage chamber 300 and the circuit chamber 400.

Thereby, the hollow 200 of the detecting element 50 is structured not to be directly communicated with the passage chamber 300.

A ventilation hole 600 being a communicating passage for communication between the hollow 200 and the circuit chamber 400 comprises a through hole 600a of the cavity 61 and a slit 600b of the resin member 70.

Figure 5A:
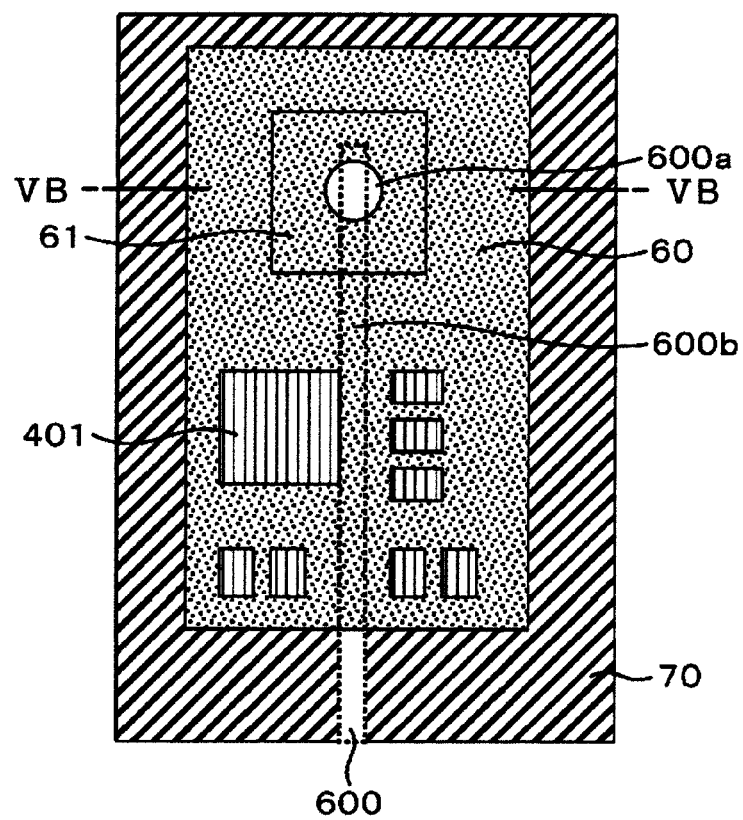
FIG. 5A is a plan view illustrating a ventilation hole of the first embodiment.
Figure 5B:
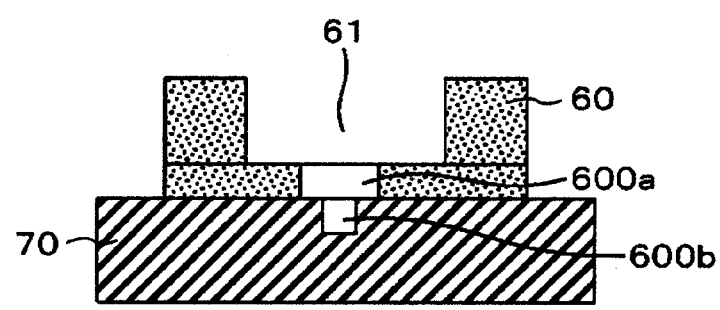
FIG. 5B is a cross sectional view taken along the line VB-VB in FIG. 5A.

FIGS. 5A and 5B show the configuration of the ventilation hole 600 as viewed from a surface thereof.

Also, the provision of a ventilation hole 650 being a communicating passage for communication between the circuit chamber 400 and the intake duct exterior 700 makes pressure in the circuit chamber 400 equal to the atmosphere and makes pressure in the hollow 200 equal to the atmosphere. Thereby, a differential pressure between the hollow 200 and an upper surface of the detecting element 50 is eliminated whereby it is possible to avoid breakage of the diaphragm 55 due to volume expansion.

Also, in the embodiment, the ventilation hole 650 for communication between the circuit chamber 400 and the intake duct exterior 700 is separately provided to thereby make the hollow 200 of the detecting element 50 equal in pressure to an outside air but an outlet of the ventilation hole 600 may be directly communicated with the intake duct exterior 700.

In the first embodiment, a LTCC substrate is adopted as a ceramic substrate, on which the detecting element 50 is mounted, but a LTCC substrate may be replaced by another ceramic substrate, a print board, or a metallic substrate.

Second Embodiment

Figure 6:
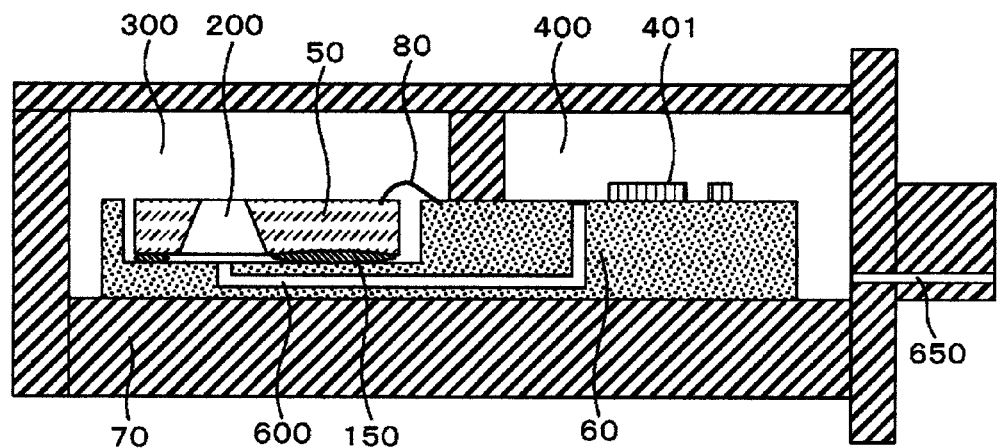
FIG. 6 is a cross sectional view of a second embodiment of the thermal air flow sensor according to the invention.

FIG. 6 schematically shows a second embodiment of a thermal air flow sensor according to the invention. The second embodiment is the same in fundamental constitution as that of the first embodiment. In the second embodiment, a ventilation hole 600 for communication between a hollow 200 and a circuit chamber 400 is formed in a ceramic substrate 60.

While the second embodiment adopts a LTCC substrate as a ceramic substrate, on which a detecting element 50 is mounted, in the same manner as in the first embodiment, another ceramic substrate, a print board, or a metallic substrate may be adopted.

By forming the ventilation hole 600 in a single constituent member, assembling of respective constituent members is increased in degree of freedom of positional tolerance and it is possible to eliminate possibility that the ventilation hole 600 is interrupted at a joint face due to dislocation.

Third Embodiment

Figure 7:
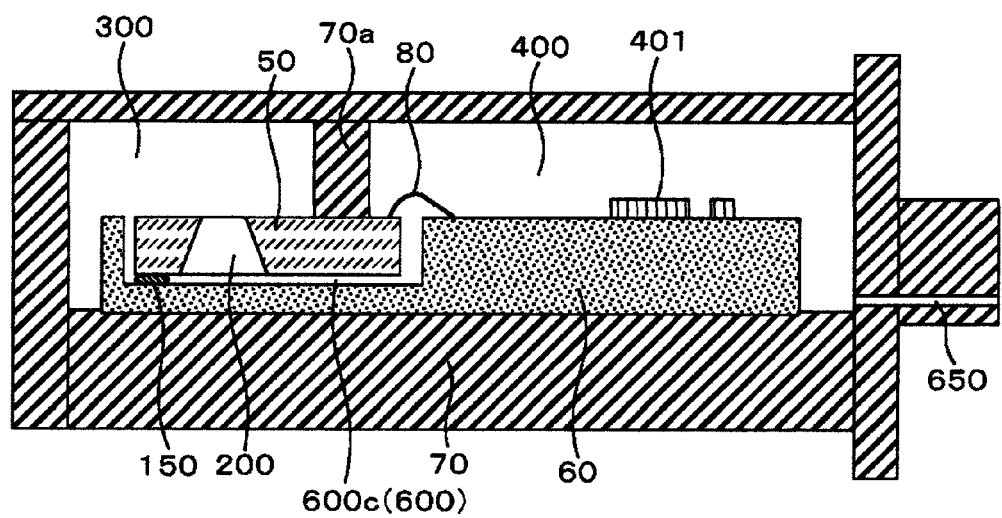
FIG. 7 is a cross sectional view of a third embodiment of the thermal air flow sensor according to the invention.

FIG. 7 schematically shows a third embodiment of a thermal air flow sensor according to the invention.

A difference from the first embodiment resides in that while the detecting element 50 is mounted fully in the passage chamber 300 in the first embodiment, a detecting element 50 is mounted to straddle a passage chamber 300 and a circuit chamber 400 in the third embodiment. The third embodiment is the same in fundamental constitution as that of the first embodiment.

As described above, since the detecting element 50 is mounted to straddle the passage chamber 300 and the circuit chamber 400, a wall 70a of a resin part 70 for separation of the passage chamber 300 and the circuit chamber 400 is provided in contact with an upper surface of the detecting element 50.

In this case, by optimizing an application configuration of an adhesive for fixation of the detecting element 50, a hollow 200 can be communicated to the circuit chamber 400 and an intake duct exterior 700 even when a ventilation hole 600 is not provided in a constituent member such as a ceramic substrate 60 and the resin member 70.

Figure 8:
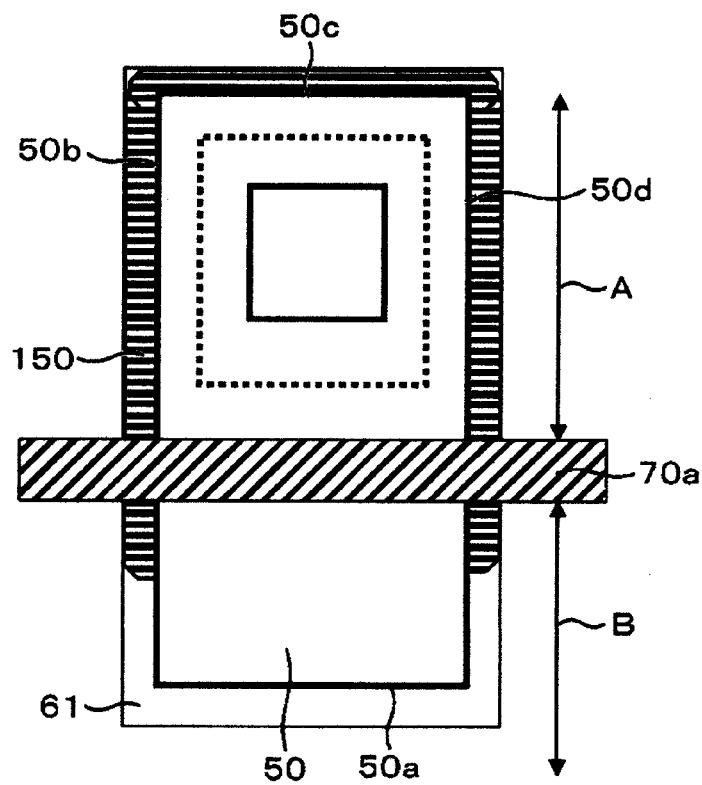
FIG. 8 is a plan view illustrating an application configuration of an adhesive in the third embodiment.

FIG. 8 shows an application configuration of an adhesive 150 in the third embodiment. As shown in FIG. 8, a range indicated by an arrow A and disposed above the wall 70a of the resin part 70 is a region of the passage chamber 300 and a range indicated by an arrow B and disposed below the wall 70a is a region of the circuit chamber 400.

The application configuration of the adhesive is a pattern, in which a rear surface is bonded or side surfaces of three sides in total, that is, an upper side 50c, an air flow upstream side 50b, an air flow downstream side 50d of the detecting element 50 are bonded.

The application configuration completely isolates the hollow 200 from the passage chamber 300.

However, it is necessary to adjust an application quantity of the adhesive 150 so that the wall 70a of the resin part 70 and the adhesive 150 bring about the isolated state.

Also, at the same time, a clearance 600c in the order of 1 μm-100 μm is defined between the rear surface of the detecting element 50 and a bottom surface of a cavity in the same manner as in the first embodiment, whereby a ventilation hole 600 for communication between the hollow 200 and the circuit chamber 400 will be formed.

Also, in the third embodiment, a constituent part for separation of the passage chamber 300 and the circuit chamber 400 comprises the resin part 70 but a wall may be formed by an adhesive, gel, etc. Also, application configuration of an adhesive in this case may be the same as that in the third embodiment.

Fourth Embodiment

Figure 9:
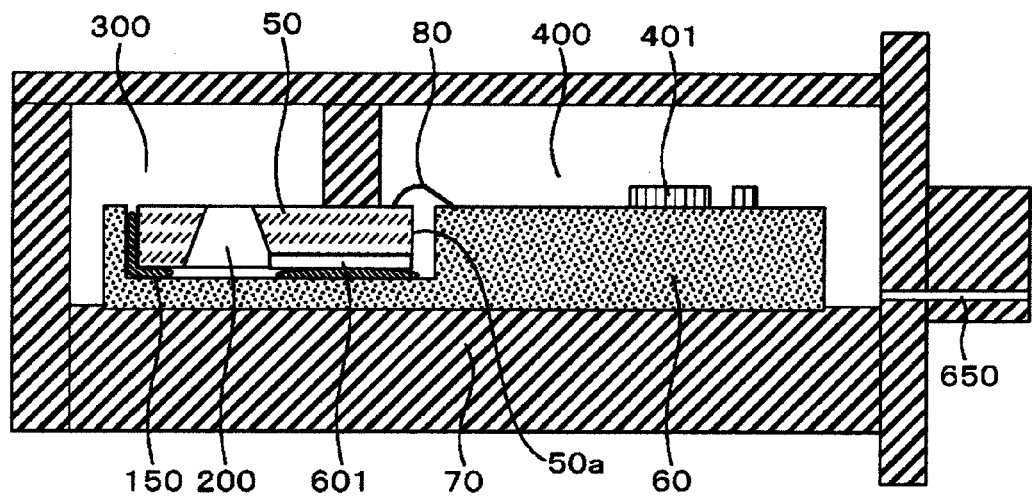
FIG. 9 is a cross sectional view of a fourth embodiment of the thermal air flow sensor according to the invention.

FIG. 9 schematically shows a fourth embodiment of a thermal air flow sensor according to the invention.

Figure 10A:
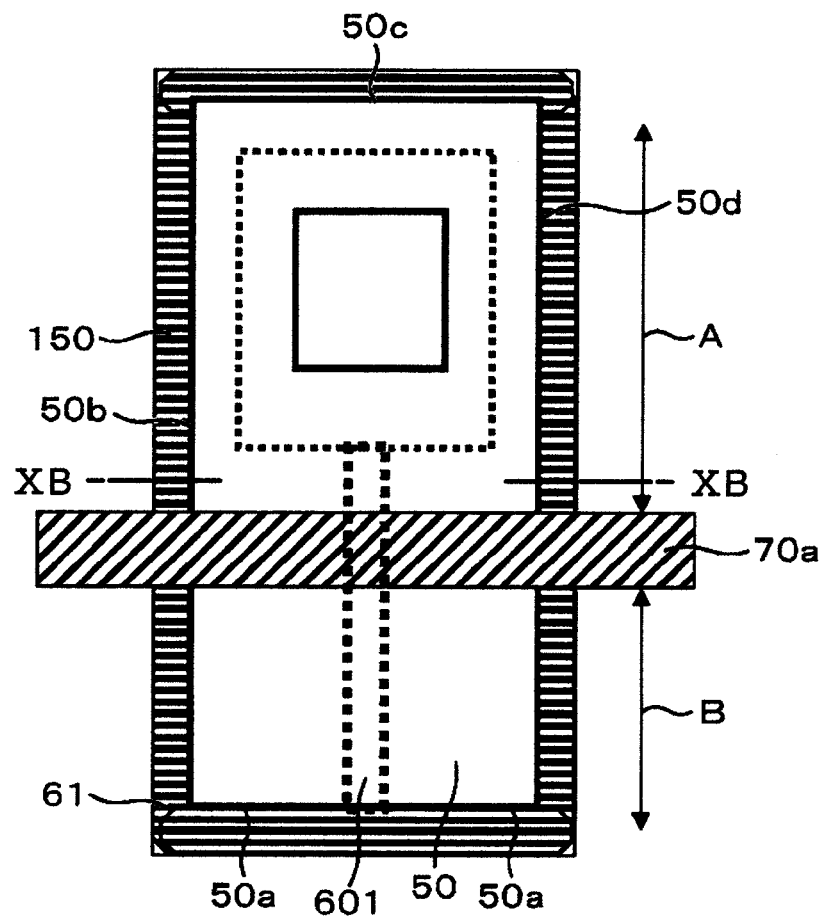
FIG. 10A is a plan view illustrating an application configuration of an adhesive in the fourth embodiment.
Figure 10B:
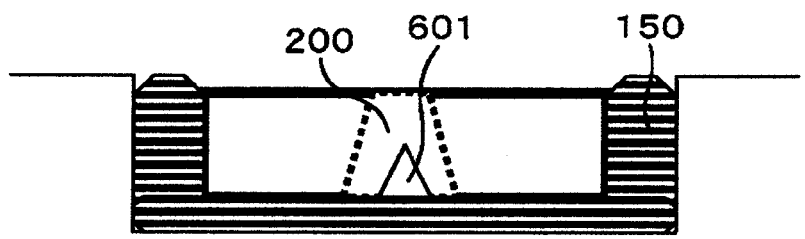
FIG. 10B is a cross sectional view taken along line XB-XB in FIG. 10A.

The embodiment is the same in fundamental constitution as that of the third embodiment. A difference from the third embodiment resides in that all four sides 50a to 50d of a detecting element 50 are bonded and a slit 601 is provided to straddle a hollow 200 and the lower side 50d of the detecting element 50 as shown in FIGS. 10A and 10B.

Since the provision of the slit 601 provides for communication between the hollow 200 and a circuit chamber 400, pressure in the hollow 200 balances with pressure on the outside to prevent breakage of a diaphragm 55.

The slit 601 can be formed by means of etching simultaneously when the hollow 200 is formed.

Fifth Embodiment

Figure 11:
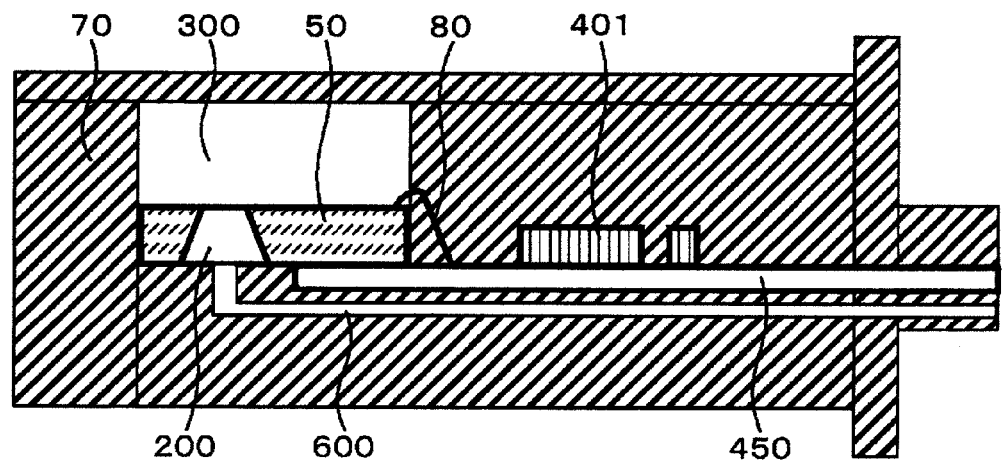
FIG. 11 is a cross sectional view of a fifth embodiment of the thermal air flow sensor according to the invention.
Figure 12:
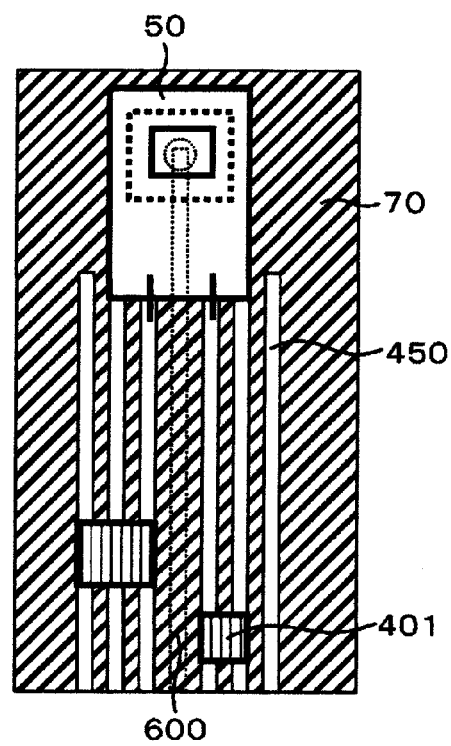
FIG. 12 is a plan view of the fifth embodiment.

FIG. 11 schematically shows a fifth embodiment of a thermal air flow sensor according to the invention.

A difference from the first embodiment resides in that a detecting element 50 is bonded to a lead frame 450 and the lead frame 450 is packaged in a resin part 70.

The detecting element 50 is first bonded to the lead frame 450 and electrically connected to the lead frame 450 by an Au wire 80. Driving circuit electronic parts 401 are likewise mounted on the lead frame 450. Subsequently, the lead frame 450 is packaged in the resin part 70. At this time, since it is unnecessary to provide any circuit chamber 400, a ventilation hole 600 for opening of a hollow 200 of the detecting element 50 is formed in a manner to communicate the hollow 200 directly to an intake duct exterior 700.

Sixth Embodiment

Figure 13:
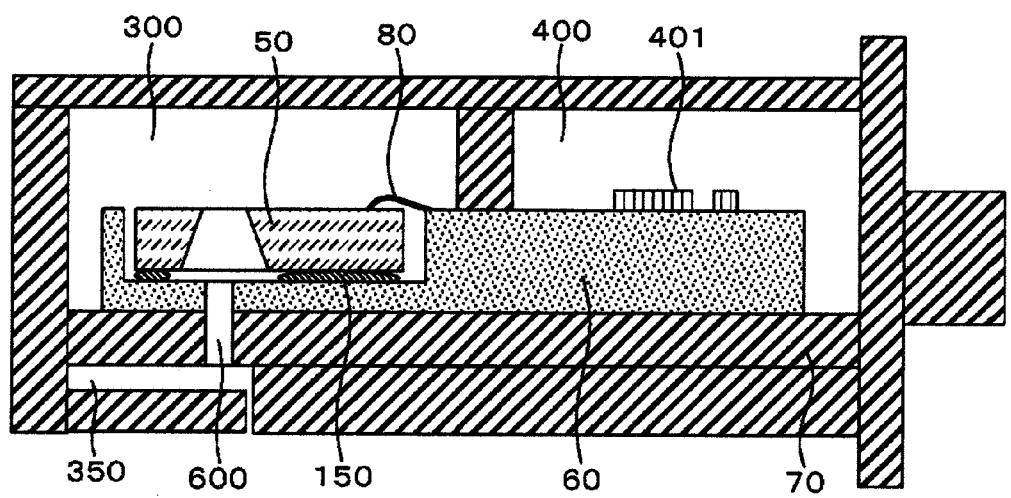
FIG. 13 is a cross sectional view of a sixth embodiment of the thermal air flow sensor according to the invention.

FIG. 13 schematically shows a sixth embodiment of a thermal air flow sensor according to the invention.

A difference from the first embodiment resides in that an opening of a ventilation hole 600 of a hollow 200 is communicated indirectly with an intake duct interior 702.

The embodiment is the same in fundamental constitution as that of the first embodiment. A manner, in which a detecting element 50 is bonded, is the same as that shown in FIGS. 4A to 4D.

In the sixth embodiment, an outlet of the ventilation hole 600 of the hollow 200 of the detecting element 50 is opened not into a circuit chamber 400 but into a sub-passage chamber 350.

The sub-passage chamber 350 is an entirely different passage from a main passage chamber 300 for conduction of a duct air to the detecting element 50 and structured so that pressure is made the same.

Accordingly, the sub-passage chamber 350 is formed so that an air flowing in the sub-passage chamber 350 is made remarkably smaller in flow rate than an air flowing in the passage chamber 300.

Since the sub-passage chamber 350 is connected directly to the intake duct interior 702, the influence of an air going round to the hollow 200 is not zero but the effect of reduction in yield is produced in a conventional structure, in which a rear surface is not put in a sealed state, because an air entering into a hollow 200 is decreased in quantity.

The invention claimed is:

1. A thermal air flow sensor having a hollow in a portion of a detecting element for detection of an air flow rate, wherein the detecting element is fixed to a sensor structural member so that the hollow is not directly communicated with a detection chamber positioned on a reverse surface to the hollow, and a communicating passage is provided to communicate the hollow to a circuit chamber, in which a driving circuit of the detecting element is mounted, or an exterior of an intake duct, in which the thermal air flow sensor is installed.

2. The thermal air flow sensor according to claim 1, wherein a first communicating passage for communication of the hollow to the circuit chamber and a second communicating passage for communication of the circuit chamber to the exterior of the intake duct are provided.

3. The thermal air flow sensor according to claim 1, wherein the detecting element is a rectangular-shaped element, and four sides of the rectangular-shaped element are bonded to the sensor structural member to completely isolate the hollow from the detection chamber.

4. The thermal air flow sensor according to claim 1, wherein the detecting element is mounted on a Low Temperature Co-Fired Ceramic laminated substrate, or a print board, or a metallic substrate, a rear surface of the substrate is wholly bonded to the sensor structural member, and the communicating passage is formed by a combination of a through hole provided in a portion of the substrate and a slit provided in the sensor structural member.

5. The thermal air flow sensor according to claim 1, wherein the communicating passage is formed in the substrate, on which the detecting element is mounted.

6. The thermal air flow sensor according to claim 1, wherein the detecting element is arranged to straddle the detection chamber and the circuit chamber, the detecting element is bonded to the substrate to completely isolate the hollow from the detection chamber, a space region, on which an adhesive is not applied, is existent on a portion of at least one of that side of the detecting element, which is positioned upstream of an air flow, that side, which is positioned downstream of the air flow, and that side, which is positioned in the circuit chamber, and the space region defines a portion of the communicating passage for communication between the hollow and the circuit chamber or the exterior of the intake duct.

7. The thermal air flow sensor according to claim 1, wherein the detecting element in a rectangular-shape is arranged to straddle the detection chamber and the circuit chamber, four sides of the rectangular-shaped detecting element are bonded to the substrate to completely isolate the hollow from the detection chamber, and the detecting element is formed with a slit, which is communicated to the hollow and a side thereof positioned in the circuit chamber.

8. The thermal air flow sensor according to claim 1, wherein the detecting element is electrically connected to a lead frame, which supports an electronic part and serves as electric wiring, the detecting element and the lead frame are packaged by a resin member, and the communicating passage is formed in the resin member.

9. A thermal air flow sensor having a hollow in a portion of a rectangular-shaped detecting element, wherein the detecting element is fixed to a substrate by bonding four sides of the detecting element to the substrate so that the hollow is not communicated directly to a passage chamber, by which air flowing in a duct is conducted to an upper surface of the detecting element, and a communicating passage is provided to communicate the hollow to a sub-passage chamber having a different path from that of the passage chamber.

10. A thermal air flow sensor comprising:
a portion of a detecting element configured to detect an air flow rate, the portion having a hollow, wherein
the detecting element is fixed to a sensor structural member so that the hollow is not directly communicated with a detection chamber positioned on a reverse surface to the hollow,
a communicating passage is provided to communicate the hollow to a circuit chamber, in which a driving circuit of the detecting element is mounted, or an exterior of an intake duct, in which the thermal air flow sensor is installed, and
the detecting element is arranged to straddle the detection chamber and the circuit chamber, the detecting element is bonded to the substrate to completely isolate the hollow from the detection chamber, a space region, on which an adhesive is not applied, is existent on a portion of at least one of that side of the detecting element, which is positioned upstream of an air flow, that side, which is positioned downstream of the air flow, and that side, which is positioned in the circuit chamber, and the space region defines a portion of the communicating passage for communication between the hollow and the circuit chamber or the exterior of the intake duct.

11. The thermal air flow sensor according to claim 10, wherein a first communicating passage for communication of the hollow to the circuit chamber and a second communicating passage for communication of the circuit chamber to the exterior of the intake duct are provided.

12. The thermal air flow sensor according to claim 10, wherein the detecting element is a rectangular-shaped element, and four sides of the rectangular-shaped element are bonded to the sensor structural member to completely isolate the hollow from the detection chamber.

13. The thermal air flow sensor according to claim 10, wherein the detecting element is mounted on a Low Temperature Co-Fired Ceramic laminated substrate, or a print board, or a metallic substrate, a rear surface of the substrate is wholly bonded to the sensor structural member, and the communicating passage is formed by a combination of a through hole provided in a portion of the substrate and a slit provided in the sensor structural member.

14. The thermal air flow sensor according to claim 10, wherein the communicating passage is formed in the substrate, on which the detecting element is mounted.

15. The thermal air flow sensor according to claim 10, wherein the detecting element in a rectangular-shape is arranged to straddle the detection chamber and the circuit chamber, four sides of the rectangular-shaped detecting element are bonded to the substrate to completely isolate the hollow from the detection chamber, and the detecting element is formed with a slit, which is communicated to the hollow and a side thereof positioned in the circuit chamber.

16. The thermal air flow sensor according to claim 10, wherein the detecting element is electrically connected to a lead frame, which supports an electronic part and serves as electric wiring, the detecting element and the lead frame are packaged by a resin member, and the communicating passage is formed in the resin member.

17. A thermal air flow sensor comprising:
a hollow formed in a portion of a detecting element configured to detect an air flow rate, wherein
the detecting element is fixed to a sensor structural member so that the hollow is not directly communicated with a detection chamber positioned on a reverse surface to the hollow,
a communicating passage is provided to communicate the hollow to a circuit chamber, in which a driving circuit of the detecting element is mounted, or an exterior of an intake duct, in which the thermal air flow sensor is installed, and
the detecting element in a rectangular-shape is arranged to straddle the detection chamber and the circuit chamber, four sides of the rectangular-shaped detecting element are bonded to the substrate to completely isolate the hollow from the detection chamber, and the detecting element is formed with a slit, which is communicated to the hollow and a side thereof positioned in the circuit chamber.

* * * * *